Patented Dec. 25, 1951

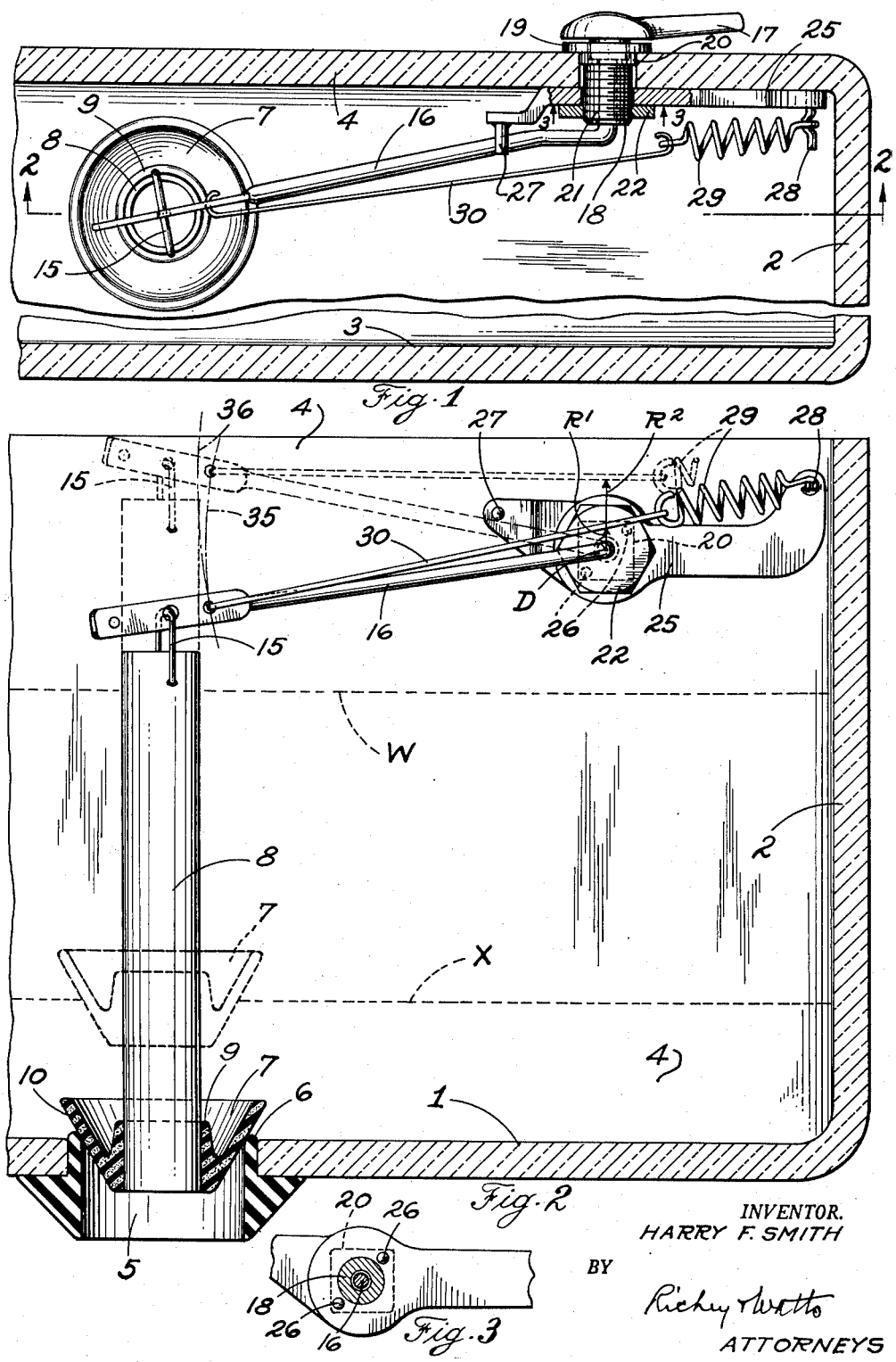

2,579,766

UNITED STATES PATENT OFFICE 2,579,766

FLUSH VALVE MECHANISM

Harry F. Smith, Lexington, Ohio, assignor to Mansfield Sanitary Pottery, Inc., Perrysville, Ohio, a corporation of Ohio Application August 23, 1949, Serial No. 111,893

4 Claims. (Cl. 4—58)

This invention relates generally to flush valves for toilet tanks and is particularly concerned with a new flush valve actuating mechanism.

One common type of flush valve mechanism for toilet tanks includes a hollow ball float valve which is lifted to open the valve and which floats down on the outgoing water and finally seats as the last of the water leaves the tank. When such a valve is used it is necessary to provide an overflow pipe leading from the tank to the bowl and either constructed as an integral part of the tank or incorporated as a part of the spud and flush valve seat. Either of these constructions is complicated and costly. The present invention provides an inexpensive overflow pipe which is combined with a cup-like flush valve and with valve actuating mechanism having a new principle and mode of operation.

In the drawings accompanying and forming a part of this specification,

Fig. 1 is a fragmentary, top, plan view of a flush tank equipped with valve actuating mechanism embodying the present invention;

Fig. 2 is a vertical, side, elevational view, partly in section, taken on line 2—2 of Fig. 1; and Fig. 3 is a plan view, partly in section, taken on line 3—3 of Fig. 1.

In the drawings, the flush tank is shown as having a bottom wall 1, end walls 2 and front and rear walls 4 and 3, respectively. In a hole in the bottom wall 1 is disposed a spud 5 which includes a cylindrical flange 6 projecting upwardly through the wall into the tank and having a rounded seating surface at its upper end. The valve comprises a cup-shaped member 7 mounted on the lower portion of an overflow tube 8. This valve has a hub portion 9 which fits closely on tube 8 and an upwardly diverging skirt 10 which, together with the tube, defines a recess which remains full of water during the flushing operation.

A bail 15 is attached to the upper portion of tube 8 and extends through a lever 16 which is suitably bent to extend through the front wall 4 of the tank and outside the tank is affixed to an actuating handle 17. A bushing 18 journals the pivoted part of lever 16 in the tank wall 4, has a flange 19 at its outer end to bear against the outer surface of the tank and has a squared portion 20 to seat in the squared opening in the tank wall 4. The inner portion of this bushing is threaded as at 21 and carries a nut 22 at the inner end. A plate 25 has an opening through which the threaded part of bushing 18 extends and carries pins 26 which project into the diagonally opposite corners of the squared hole in tank wall 4, these pins serving to prevent rotational movement of plate 25. When nut 22 is screwed onto bushing 18, plate 25 is fixed relative to the tank wall and lever 16.

Plate 25 has arms extending laterally in opposite directions. One arm has a stop 27 projecting therefrom above lever 16 to engage and prevent upward movement of the lever beyond a predetermined position. Its other arm has a pin 28 to which one end of spring 29 is connected. The other end of that spring is connected to one end of rod 30, the other end of which extends through a hole in lever 16 adjacent to tube 8. The pin 28 is positioned above a projection of lever 16, or above the horizontal plane of the pivoted part of the lever, so that when the lever moves from the valve closed position to the valve opened position, indicated by the dotted lines in Fig. 2, the spring 29 may contract slightly. This contraction is indicated by the arcs shown on Fig. 2, arc 35 indicating the line of travel of the opening about its center of rotation in bushing 18 and arc 36 indicating the path of movement of the end of rod 30 and spring 29 in pivoting about pin 28, assuming no contraction of the spring. It will be noted that the rod and spring make an acute included angle of only a few degrees with lever 16 when the valve is closed but make a much larger angle when the valve is open.

By reason of the illustrated and just described position of the lever 16 and rod 30 with its spring 29, it will be seen that the weight of the flush valve assembly including valve 7, tube 8, bail 15 and lever 16 will exert a counterclockwise moment about the pivot point D, i. e., the portion of the lever 16 which is rotatably mounted in bushing 18. However, this moment remains substantially constant throughout the entire travel of the valve since the moment arm remains substantially constant. It will also be seen that any tension exerted by spring 29 will be transmitted to lever 16 through rod 30 and that this tension will exert a clockwise moment. When the flush valve is at its lowest or closed position, the moment arm of this clockwise moment is the radius $R^1$, i. e., the distance from the center of rotation of lever 16 to the rod 30. When the valve is in its uppermost or open position the moment arm is the radius $R^2$ which is the distance from the center of rotation of lever 16 to rod 30 in its then position. While the tension on spring 29 will decrease only slightly during movement of the lever 16 from its lowermost position to its uppermost position, this decrease being represented by the slight difference between arcs 35 and 36, the effective turning moment will be greatly increased due to the lengthening of the radius from $R^1$ to $R^2$.

It will be understood that by adjusting the tension on spring 29 it is possible to vary the amount of lift exerted on the valve and to adjust the lift to hold the valve open but not enough to open the valve when it is in closed position.

The illustrated combination of parts insures maintenance of the valve in open position after it has been actuated to that position, as by operation of the hand lever outside of the tank, and automatically moves the valve to closed position when substantially all the water has run out of the tank. This closing action results as follows: When the tank is filled with water to the desired depth, the surface being indicated at W in Fig. 2, and the valve is actuated to valve open position, the cup-shaped valve 7 will be completely submerged and will be filled with water. However, the water in the valve does not add anything to the weight of the valve assembly until such time as the water level in the tank falls to a level below the top of this valve 7. As the water level falls below the top of valve 7 the weight of water in the valve above the water level adds to the weight of the valve assembly and this increase in weight increases the counterclockwise moment. As the water level continues to fall, more of the weight of the valve and water in it is added to the effective weight of the assembly due to the decrease in buoyant effect of the water. When the counterclockwise moment becomes greater than the clockwise moment exerted by spring 29, the valve begins to move downwardly with coincident turning movement of lever 16 and rod 30 about their pivots. The downward movement of lever 16 rapidly decreases radius $R^2$ and the clockwise turning moment of rod 30 and correspondingly reduces the holding power of the spring. This decrease is rapid and progressive and, as a result, the valve drops quickly into the discharge opening where valve 7 makes sealing seating contact on the flange 6 of the spud. Following this closing of the valve, refilling of the tank with water may take place through any suitably controlled inlet valve.

Having thus described my invention so that others skilled in the art may be able to understand and practice the same, I state that what I desire to secure by Letters Patent is defined in what is claimed.

What is claimed is:

1. A flush valve mechanism for toilet tanks comprising a valve seat, a valve to engage said seat and provided with a water reservoir, an overflow pipe passing through the valve and attached at its upper end to a manually operated lever having a journalled bearing in the side of the tank, anchor means fixed in position on the opposite side of, and in a horizontal plane above that of, the journalled bearing, a member connected at one end to the lever near said pipe and extending in a plane above said bearing, and connecting means connecting the other end of said member to said anchor means, said connecting means being resiliently yieldable longitudinally of the axis of said member.

2. Flush valve mechanism for a toilet tank comprising an overflow tube, a valve on the lower part of the tube having an upwardly diverging skirt defining a water retaining recess around said tube, a tube lifting lever swingably connected to the upper part of the tube and having a part pivotally mounted in a wall of the tank, a non-rotatable plate having an arm extending laterally away from said tube and the pivoted part of said lever, a pin in said arm above the horizontal plane of said pivoted part of the lever, a rod attached to said lever adjacent to said tube and a coil spring connecting the other end of said rod to said pin.

3. Flush valve mechanism for a toilet tank comprising an overflow tube, a valve on its lower portion having an upwardly diverging skirt defining a water retaining recess around said tube, a tube lifting lever swingably connected to the upper portion of the tube and having a part pivoted to the tank, a non-rotatble plate having an arm extending laterally away from said tube and pivoted part of the lever, a pin at the free end of said arm, a rod and a coil spring attached end to end and extending between and attached to said pin and said lever near said tube, the axis of the rod and spring passing nearer to the center of rotation of the lever when the valve is closed than when it is open and lying above that center when the valve is open.

4. Flush valve mechanism for a toilet tank comprising an overflow tube, a valve on the tube having an upwardly diverging skirt defining a water retaining recess around said tube, a tube lifting lever swingably connected to the tube and having a part pivotally mounted in a wall of the tank, a non-rotatable plate having arms extending horizontally in opposite directions from the pivoted part of said lever, a stop in one arm to engage the top of said lever when the valve is in open position, a pin in the other arm, a rod attached to said lever adjacent to said tube and a coil spring connecting the other end of said rod to said pin, said pin being located above the projection of the axis of the tube lifting lever when the valve is closed.

HARRY F. SMITH.

REFERENCES CITED

The following references are of record in the file of this patent:

UNITED STATES PATENTS

| Number | Name | Date |
| --- | --- | --- |
| Re. 16,913 | MacMillan | Mar. 20, 1928 |
| 300,540 | Weeden | June 17, 1884 |
| 1,613,670 | Meighan | Jan. 11, 1927 |
| 1,641,652 | Wulf | Sept. 6, 1927 |
| 2,495,213 | Drum | Jan. 24, 1950 |
| 2,528,556 | Schulz | Nov. 7, 1950 |